(12) United States Patent
Cheng et al.

(10) Patent No.: US 12,487,613 B2
(45) Date of Patent: Dec. 2, 2025

(54) MACHINE FOR SMASHING THERMOSETTING MATERIALS

(71) Applicant: INDUSTRIAL TECHNOLOGY RESEARCH INSTITUTE, Hsinchu (TW)

(72) Inventors: Pin-Tsung Cheng, Kaohsiung (TW); Shuo-Peng Liang, Taichung (TW); Jen-Ji Wang, Changhua County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 317 days.

(21) Appl. No.: 18/369,377

(22) Filed: Sep. 18, 2023

(65) Prior Publication Data

US 2025/0013252 A1    Jan. 9, 2025

(30) Foreign Application Priority Data

Jul. 5, 2023   (TW) ................................. 112125095

(51) Int. Cl.
   *G05D 11/13*    (2006.01)
   *B02C 19/00*    (2006.01)
   (Continued)

(52) U.S. Cl.
   CPC ........ *G05D 11/135* (2013.01); *B02C 19/0056* (2013.01); *B09B 3/35* (2022.01);
   (Continued)

(58) Field of Classification Search
   CPC ..... G05D 11/135; B02C 19/0056; B09B 3/35; B09B 3/38; B09B 3/70; B09B 2101/80
   See application file for complete search history.

(56) References Cited

U.S. PATENT DOCUMENTS

| 6,418,958 B1 * | 7/2002 | Rossi | B01F 25/25 137/5 |
| 11,161,762 B2 * | 11/2021 | Wood | C02F 9/00 |
| 2025/0013252 A1 * | 1/2025 | Cheng | B09B 3/38 |

FOREIGN PATENT DOCUMENTS

| CN | 1625437 A | 6/2005 |
| CN | 1302881 C | 3/2007 |

(Continued)

OTHER PUBLICATIONS

Pin-Tsung Cheng et al., Green-Material Cleaner Production Process for Processing Thermosetting Waste Rubbers by Ultra-High Pressure Fluid Device—Examples of Waste Tires, 2010, Symposium on Cleaner Production and Environmental Protection Technology.

(Continued)

*Primary Examiner* — Bob Zadeh
(74) *Attorney, Agent, or Firm* — Troutman Pepper Locke LLP; Tim Tingkang Xia, Esq.

(57) ABSTRACT

A machine for smashing thermosetting materials includes a high-pressure direct drive pump assembly, a mixing tank, a chemical solution tank, a hydraulic-control solenoid valve, a low-pressure auxiliary pump, a directional valve set and a controller. The controller, connected signally with the high-pressure direct drive pump assembly, the mixing tank, the chemical solution tank, the hydraulic-control solenoid valve, the low-pressure auxiliary pump and the directional valve set, is used to control opens and closes of the first directional valve, the second directional valve, the third directional valve and the hydraulic-control solenoid valve so as to supply the chemical solution in the chemical solution tank to the mixing tank.

3 Claims, 6 Drawing Sheets

(51) Int. Cl.
 B09B 3/35 (2022.01)
 B09B 3/38 (2022.01)
 B09B 3/70 (2022.01)
 B09B 101/80 (2022.01)
(52) U.S. Cl.
 CPC ............... B09B 3/38 (2022.01); B09B 3/70 (2022.01); *B09B 2101/80* (2022.01)

(56) References Cited

FOREIGN PATENT DOCUMENTS

| | | | |
|---|---|---|---|
| CN | 1923486 A | 3/2007 | |
| CN | 102765146 A | 11/2012 | |
| CN | 103660074 A | 3/2014 | |
| CN | 104768710 B | 9/2017 | |
| CN | 108215006 A | 6/2018 | |
| CN | 108247910 A | 7/2018 | |
| CN | 109483769 A | 3/2019 | |
| CN | 209615728 U | 11/2019 | |
| CN | 110709209 A | 1/2020 | |
| CN | 209937424 U | 1/2020 | |
| CN | 111231177 A | 6/2020 | |
| CN | 110524442 B | 2/2021 | |
| CN | 115069725 A | 9/2022 | |
| KR | 101700890 B1 * | 2/2017 | ............ G06Q 50/06 |
| TW | 267123 B | 1/1996 | |
| TW | 200840657 A | 10/2008 | |
| TW | 200927384 A | 7/2009 | |
| TW | M371634 U | 1/2010 | |
| TW | M371635 U | 1/2010 | |
| TW | M371637 U | 1/2010 | |
| TW | M371638 U | 1/2010 | |
| TW | 201041668 A | 12/2010 | |
| TW | 201206580 A | 2/2012 | |
| TW | I361730 B | 4/2012 | |
| TW | I568562 B | 2/2017 | |
| TW | I621590 B | 4/2018 | |
| TW | I640586 B | 11/2018 | |
| TW | 202128386 A | 8/2021 | |
| WO | WO-2005035112 A1 * | 4/2005 | ............... B09B 3/70 |

OTHER PUBLICATIONS

A.J. Bowles et al., Sustainable rubber recycling from waste tyres by waterjet: A novel mechanistic and practical analysis, 2020, Sustainable Materials and Technologies, 25.
Krzysztof Formela, Sustainable development of waste tires recycling technologies—recent advances, challenges and future trends, 2021, Advanced Industrial and Engineering Polymer Research, 4.
Shujun Tan et al., Waste nitrile rubber powders enabling tougher 3D printing photosensitive resin composite, 2022, Polymer, 243.
Wang Zefeng et al., Recycling waste tire rubber by water jet pulverization: Powder characteristics and reinforcing performance in natural rubber composites, 2017, Journal of Polymer Engineering.
Henryk Holka et al., Recycling of car tires by means of Waterjet technologies, 2017, AIP Conf. Proc. 1822, 020008.
Ubaidillah Sabino et al., Rheological properties of a reclaimed waste tire rubber through high-pressure high-temperature sintering, 2017, AIP Conference Proceedings, 1788.
N. S. S. Saimi et al., Mechanical properties of tire reclaimed rubber/NR blends: Effect of blend ratios, 2021, AIP Conference Proceedings, 2339.
Ubaidillah Sabino et al., Perfect sound insulation property of reclaimed waste tire rubber, 2016, AIP Conference Proceedings, 1717.
Shouxu Song et al., Cavitation desulfurization in vulcanized rubber recycling under ultra-high pressure water jet, 2016, Journal of Polymer Engineering.
Zefeng Wang et al., Preparation of devulcanized ground tire rubber with supercritical carbon dioxide jet pulverization, Materials Letters, vol. 282, 2021.
Krzysztof Formela et al., Recent Advances in Development of Waste-Based Polymer Materials: A Review, 2022, Polymers, 14, 1050.
Zefeng Wang et al., Mechanochemical devulcanization of waste tire rubber in high pressure water jet pulverization, Sage Journals, 2021.
Zhonghuai Wu et al., Effect of abrasive grain position patterns on the deformation of 6H-silicon carbide subjected to nano-grinding, International Journal of Mechanical Sciences, vol. 211, 2021.
T. Nguyen et al., Effect of liquid properties on the stability of an abrasive waterjet, 2008, International Journal of Machine Tools and Manufacture, vol. 48, pp. 1138-1147.
Ya-Wei Lee et al., Experimental and theoretical analysis of microjet droplet behavior, 2007, Microelectronic Engineering, vol. 84, pp. 1770-1774.
Mohamed Hashish, A model for abrasive-waterjet (AWJ) machining, J. Eng. Mater. Technol., 1989, 111(2): 154-162.
Jun Wang, Abrasive Waterjet Machining of Engineering Materials, UNSW, 2003.
Rollin Peter Grant et al., Newtonian jet stability, A.I.Ch.E Journal, 1966.
M.J. McCarthy et a., Review of stability of liquid jets and the influence of nozzle design, 1974, The Chemical Engineering Journal, 7, pp. 1-20.
D.S. Miller, Micromachining with abrasive waterjets, 2004, Journal of Materials Processing Technology, 149, pp. 37-42.
Taiwan Patent Office, "Office Action", Feb. 26, 2024, Taiwan.

* cited by examiner

MACHINE FOR SMASHING THERMOSETTING MATERIALS

CROSS REFERENCE TO RELATED APPLICATION

This application claims the benefits of Taiwan application Serial No. 112125095, filed on Jul. 5, 2023, the disclosures of which are incorporated by references herein in its entirety.

TECHNICAL FIELD

The present disclosure relates in general to a machine for smashing thermosetting materials.

BACKGROUND

Currently, waste tires are usually decomposed into tire-derived fuels (TDF) after mechanical crushing. However, such a process is likely to pollute the environment and ecology, and hard to meet the needs of circular economy. For this reason, current technology for processing waste tires is focused on material recycling. Although waste tires are useful resources, yet, due to the nature of thermosetting polymer materials, the recycling technology is still way to overcome.

In existing technologies, water (clean water) is usually used as a medium to recycle waste tires through water jetting. In a typical water-jetting technology, a high-pressure water jet is introduced to process waste tires. Under the water jet, rigidity of waste tire would be gradually decreased, because the surface rubber of the waste tire would be peeled off gradually and thus metal wires inside the waste tire would lose their restraint and go disorderly. As a result, problems such as tangling and entanglement at a water-jet nozzle may rise, and thus insufficient processing efficiency and other related defects would be inevitable.

Hence, in order to resolve deficiencies or shortages of existing equipment and products in using the water as a medium to process the thermosetting materials such as waste tires and waste rubber, an effort for improvement is definitely urgent and necessary to the skill in the art.

SUMMARY

An object of the present disclosure is to provide a machine for smashing thermosetting materials that can recycle the thermosetting materials by adding a nano-scale media other than water to generate chemical reactions, so that the waste or defective polymer materials can be regenerated through this recycling, new functional material properties can be obtained, and re-usability of recycling can be enhanced.

In this disclosure, a machine for smashing thermosetting materials, includes a high-pressure direct drive pump assembly, a mixing tank, a chemical solution tank, a hydraulic-control solenoid valve, a low-pressure auxiliary pump, directional valve set and a controller. The controller is connected signally with the high-pressure direct drive pump assembly, the mixing tank, the chemical solution tank, the hydraulic-control solenoid valve, the low-pressure auxiliary pump and the directional valve set. A first directional valve of the directional valve set is connected spatially between the high-pressure direct drive pump assembly and a nozzle. A second directional valve of the directional valve set is connected spatially between the high-pressure direct drive pump assembly and the mixing tank. A third directional valve of the directional valve set is connected spatially between the chemical solution tank and the mixing tank. The hydraulic-control solenoid valve is spatially connected between the chemical solution tank and the mixing tank. The controller is to control opens and closes of the first directional valve, the second directional valve, the third directional valve and the hydraulic-control solenoid valve.

As stated, by providing the machine for smashing thermosetting materials in this disclosure, the high-pressure chemical solution (a polymer solution for example) can be discharged via the nozzle to process the thermosetting materials. Thereupon, the thermosetting materials can be recovered as a new functional material, and also the re-usability thereof can be substantially enhanced.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
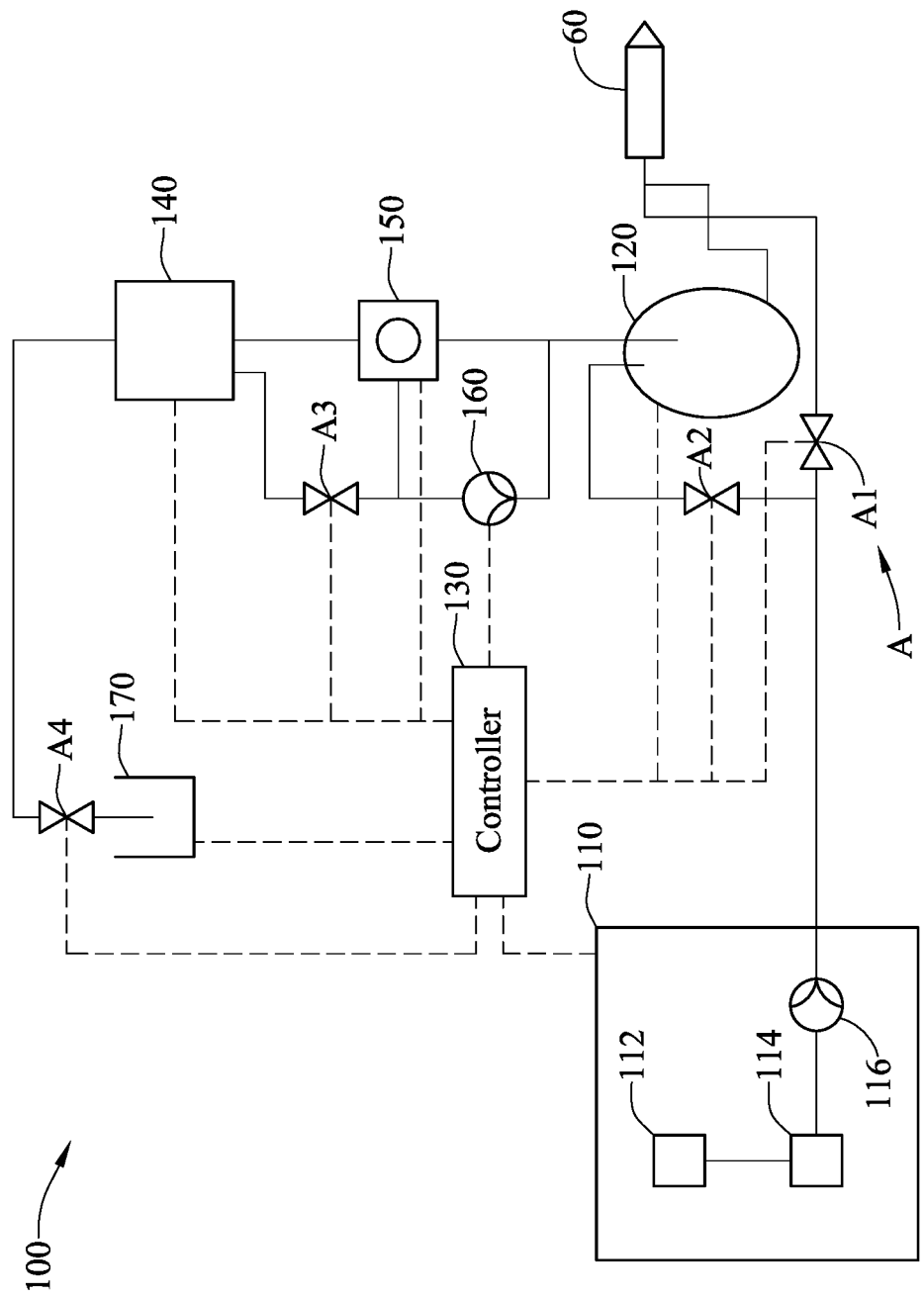
FIG. 1 is a schematic view of a preferred machine for smashing thermosetting materials in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the following description, terms such as "including", "comprising", and "having" mentioned in this disclosure are all open terms to provide a meaning of "including but not limited to".

In the following description of various embodiments, when terms such as "first", "second", "third", "fourth" etc., are used to describe elements, they are only used to distinguish these elements from each other, but not to limit order or importance of these elements.

In the following description of various embodiments, the so-called "coupling" or "connection" may refer to two or more elements being in direct physical or electrical contact with each other, or indirect physical or electrical contact with each other. In addition, terms "coupling" or "connecting" may also mean that two or more elements are related in motion with each other.

FIG. 1 is a schematic view of a preferred machine for smashing thermosetting materials in accordance with this disclosure. As shown, the machine for smashing thermosetting materials 100 includes a high-pressure direct drive pump assembly 110, a mixing tank 120, a controller 130, a chemical solution tank 140, a hydraulic-control solenoid valve 150, a low-pressure auxiliary pump 160, a chemical-solution refill barrel 170, and a directional valve set A consisted of a first directional valve A1, a second directional valve A2, a third directional valve A3 and a fourth directional valve A4. The controller 130 is connected signally and individually with the high-pressure direct drive pump assembly 110, the mixing tank 120, the chemical solution tank 140, the chemical-solution refill barrel 170, the first directional valve A1, the second directional valve A2, the third directional valve A3 and the fourth directional valve A4 (shown in dashed lines) so as to smartly monitor pressures, temperatures, concentrations and volumes of the chemical solutions inside the high-pressure direct drive pump assembly 110, the mixing tank 120, the chemical solution tank 140 and the chemical-solution refill barrel 170. In this disclosure, the chemical solution can be a polar liquid, a halogen liquid or a medium and high electronegativity liquid.

In this embodiment, the chemical solution can be a high polymer solution, and this high polymer refers to a high molecular weight compound composed of many identical and simple structural units that can be repeatedly connected through covalent bonds or ionic bonds. The high polymer solution contains a solvent and a solute, the solvent can be pure water or a polar-philic liquid, and the solute can be water-soluble and/or electronegative molecules. Also, types and proportions of chemical solutions inside the high-pressure direct drive pump assembly 110, the mixing tank 120, the chemical solution tank 140 or the chemical-solution refill barrel 170 can be adjusted according to practical requirements.

The high-pressure direct drive pump assembly 110 includes a solution tank 112, a boost source 114 and a direct drive pump 116, where the boost source 114 is connected between the solution tank 112 and the direct drive pump 116. In one exemplary example of this embodiment, a first directional valve A1 is disposed between the high-pressure direct drive pump assembly 110 and the nozzle 60. With the first directional valve A1 in a connection state (while the second directional valve A2 is in a disconnection state), the high-pressure direct drive pump assembly 110 can be directly connected with the nozzle 60. On the other hand, the mixing tank 120 is disposed between the high-pressure direct drive pump assembly 110 and the nozzle 60. With the second directional valve A2 in a connection state (while the first directional valve A1 is in a disconnection state), the high-pressure direct drive pump assembly 110 can connect the mixing tank 120 via the second directional valve A2. In shall be explained that the controller 130 can control the first directional valve A1 and the second directional valve A2 to be open or close (i.e., in a connection or disconnection state). In an exemplary example of the direct pump, the first directional valve A1 is open (i.e., in the connection state), and the second directional valve A2 is close (i.e., in the disconnection state). On the other hand, in an exemplary example of a bypass pump, the first directional valve A1 is close (i.e., in the disconnection state), and the second directional valve A2 is open (i.e., in the connection state). In the following description, FIG. 2 and FIG. 3 are introduced to elucidate the direct pump and the bypass pump.

Figure 2:
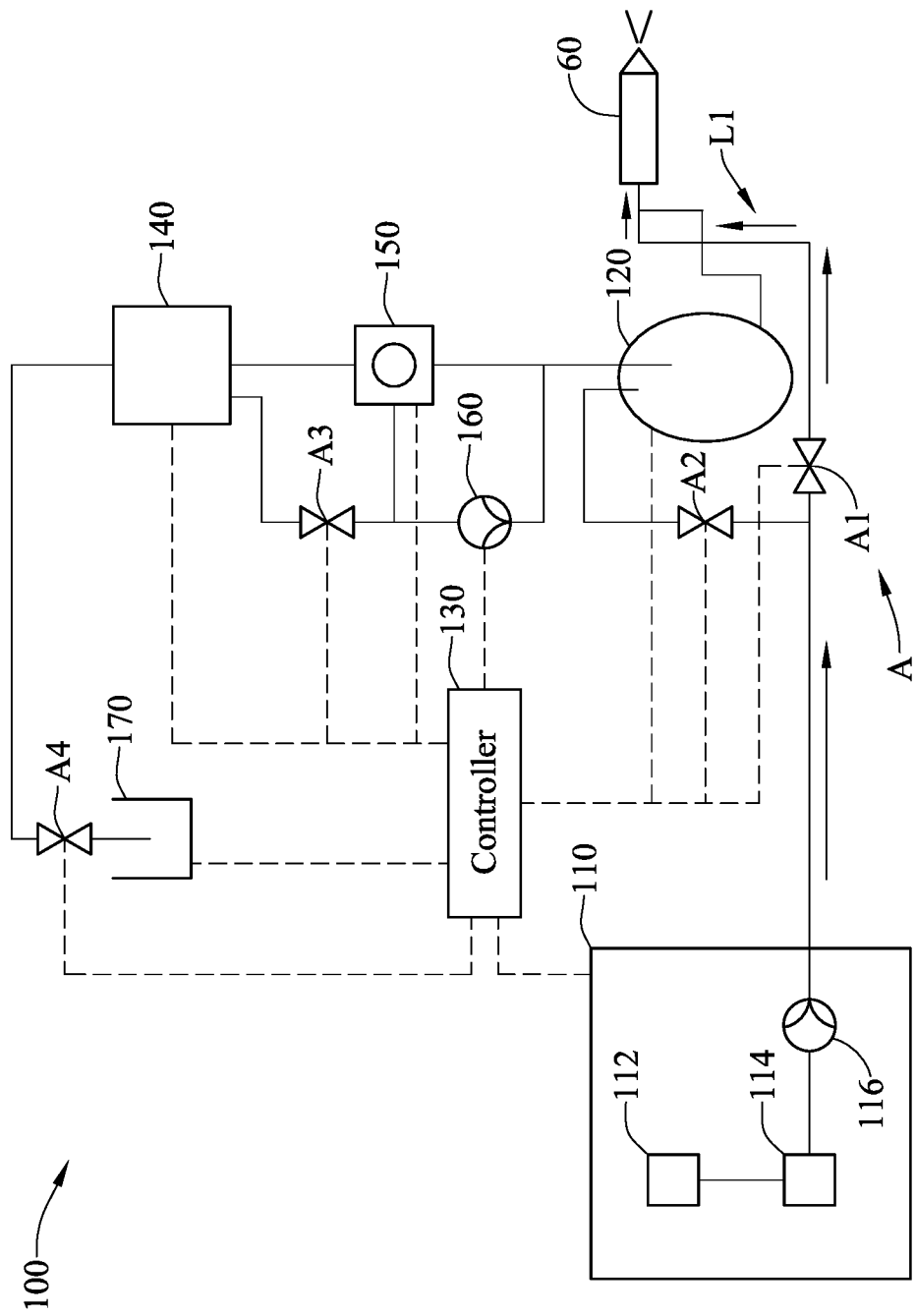
FIG. 2 illustrates schematically a flow path of FIG. 1 from the high-pressure direct drive pump assembly to the nozzle via the first directional valve.

In the exemplary example of the direct pump shown in FIG. 2, the controller 130 controls the first directional valve A1 to open, and closes the second directional valve A2, so as to establish the first flow path L1 from the high-pressure direct drive pump assembly 110 directly to the nozzle 60. The controller 130 controls the flow of the chemical solution modulated by intelligent monitoring control in the high-pressure direct drive pump assembly 110. The boost source 114 sends the chemical solution in the solution tank 112 to the direct drive pump 116. Under a condition of constant concentration, the direct pump 116 of the high-pressure direct drive pump assembly 110 boosts the pressure directly to reach a preset pressure for the working fluid, such that the chemical solution can reach a high pressure to some degree. The high-pressure chemical solution would be ejected at a high speed from the nozzle 60 to proceed the following machining, such as a composite process for impacting, shearing and tearing the thermosetting materials. Thereupon, the machine for smashing thermosetting materials 100 of this disclosure can use a non-aqueous body as a high-pressure source. By adding other nano-scale media other than non-aqueous media to generate chemical reactions, the waste or defective polymer materials can be recycled and then regenerated, can be endowed with new functional material characteristics, can be improved with enhanced re-usability performance. The nozzle 60 can provide, for example, a rotation jet for crushing and cutting, and have a adjustable diameter for obtaining the required flow and power values.

Figure 3:
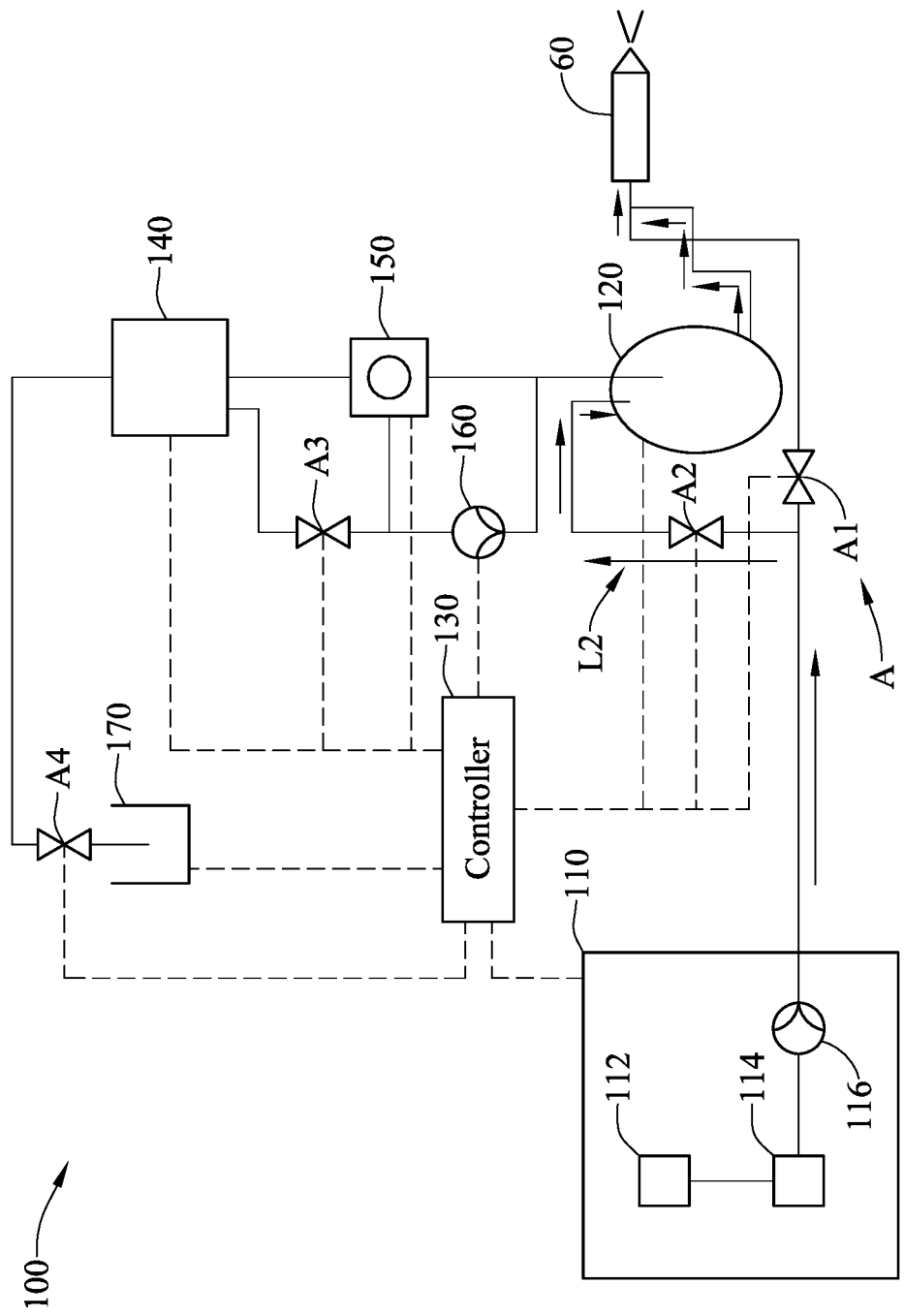
FIG. 3 illustrates schematically a flow path of FIG. 1 from the high-pressure direct drive pump assembly to the nozzle via the mixing tank.

In the exemplary example of the bypass pump shown in FIG. 3, the controller 130 controls the second directional valve A2 to open, and closes the first directional valve A1, so as to establish the second flow path L2 from the high-pressure direct drive pump assembly 110 to the nozzle 60 via the mixing tank 120. The controller 130 controls the flow of the chemical solution modulated by intelligent monitoring control in the high-pressure direct drive pump assembly 110. The boost source 114 sends the chemical solution in the solution tank 112 to the direct drive pump 116, and also into the mixing tank 120. Through a liquid pressure set by the second directional valve A2 (the pressure value or the flow rate can be adjusted by motor's rpm), the predetermined operational pressure can be achieved to present the chemical solution (for example, a polymer solution) in a high-pressure liquid state to be discharged in a high speed through the nozzle 60 for performing the following processing. In this embodiment, the chemical solution in the high-pressure direct drive pump assembly 110 and that inside the mixing tank 120 are mixed together and stirred by a concentration ratio determined by the controller 130. The mixing ratio and the constant concentration state of the above-mentioned solvents and solutions can be monitored by the intelligence of the controller 130. For example, the electronegativity of the combined chemical solution (such as a polymer solution) can be adjusted to be greater than 1.8.

In one embodiment, the chemical solution in the high-pressure direct drive pump assembly 110 and that inside the mixing tank 120 can be different. Yet, in some other embodiments, the chemical solution in the high-pressure direct drive pump assembly 110 and that inside the mixing tank 120 can be the same.

In one embodiment, the mixing tank 120 can be designed to have a smooth bottom, oval, round or the like. Through such a bottom design, possible deposition of the chemical solution at the bottom of the mixing tank 120 can be avoided.

In one embodiment, the chemical solution tank 140 is used to supply the chemical solution to the mixing tank 120, so as there to mix the chemical solution provided from the high-pressure direct drive pump assembly 110. Thus, according to practical requirements, types of the chemical solutions can be various or identical. The hydraulic-control solenoid valve 150 is connected between the chemical solution tank 140 and the mixing tank 120. On the other hand, the low-pressure auxiliary pump 160, connected spatially between the chemical solution tank 140 and the mixing tank 120, is controlled by the third directional valve A3. In this embodiment, the controller 130 monitors the concentration of the chemical solution in the mixing tank 120 so as to ensure the constant concentration state. When any deficiency at the concentration, flow rate or temperature of the chemical solution inside the mixing tank 120 is detected, the controller 130 would evaluate the detected value inside the chemical solution tank 140 to decide the supply of the chemical solution (a polymer solution for example) from the chemical solution tank 140 to the mixing tank 120. In this embodiment, the openness of the third directional valve A3 and the output of the low-pressure auxiliary pump 160 can be adjusted according to practical needs of the pressure, the concentration and the flow rate. Such an adjustment will be elucidated in the following sections referred to FIG. 4 and FIG. 5.

Figure 4:
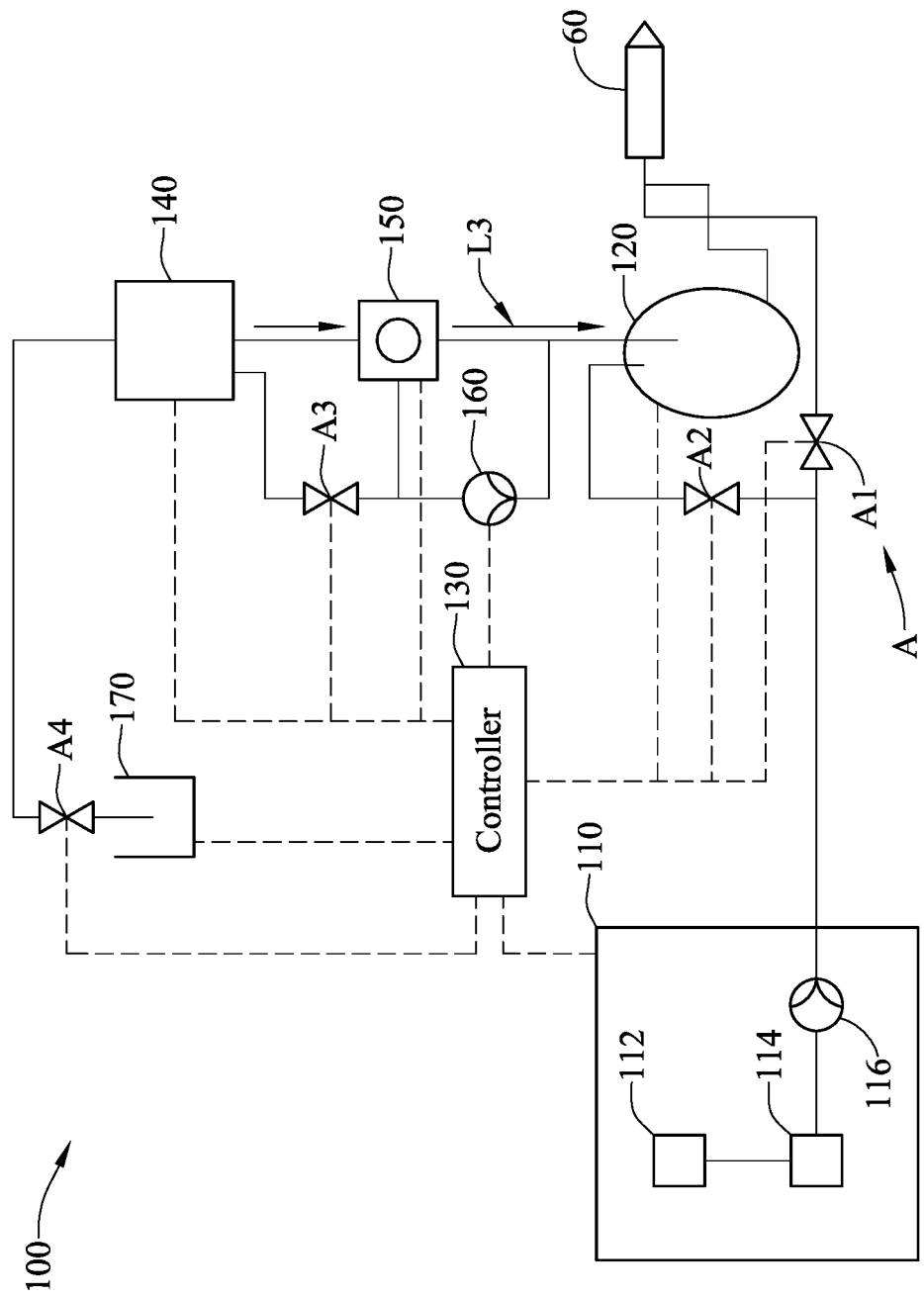
FIG. 4 illustrates schematically a flow path of FIG. 1 from the chemical solution tank to the mixing tank via the hydraulic-control solenoid valve.

In FIG. 4, the controller 130 opens the hydraulic-control solenoid valve 150, and closes the third directional valve A3, such that the chemical solution inside the chemical solution tank 140 wouldn't flow through the low-pressure auxiliary pump 160, but flows into the mixing tank 120 via the hydraulic-control solenoid valve 150 for forming the third flow path L3 from the chemical solution tank 140 to the mixing tank 120 via the hydraulic-control solenoid valve 150.

Figure 5:
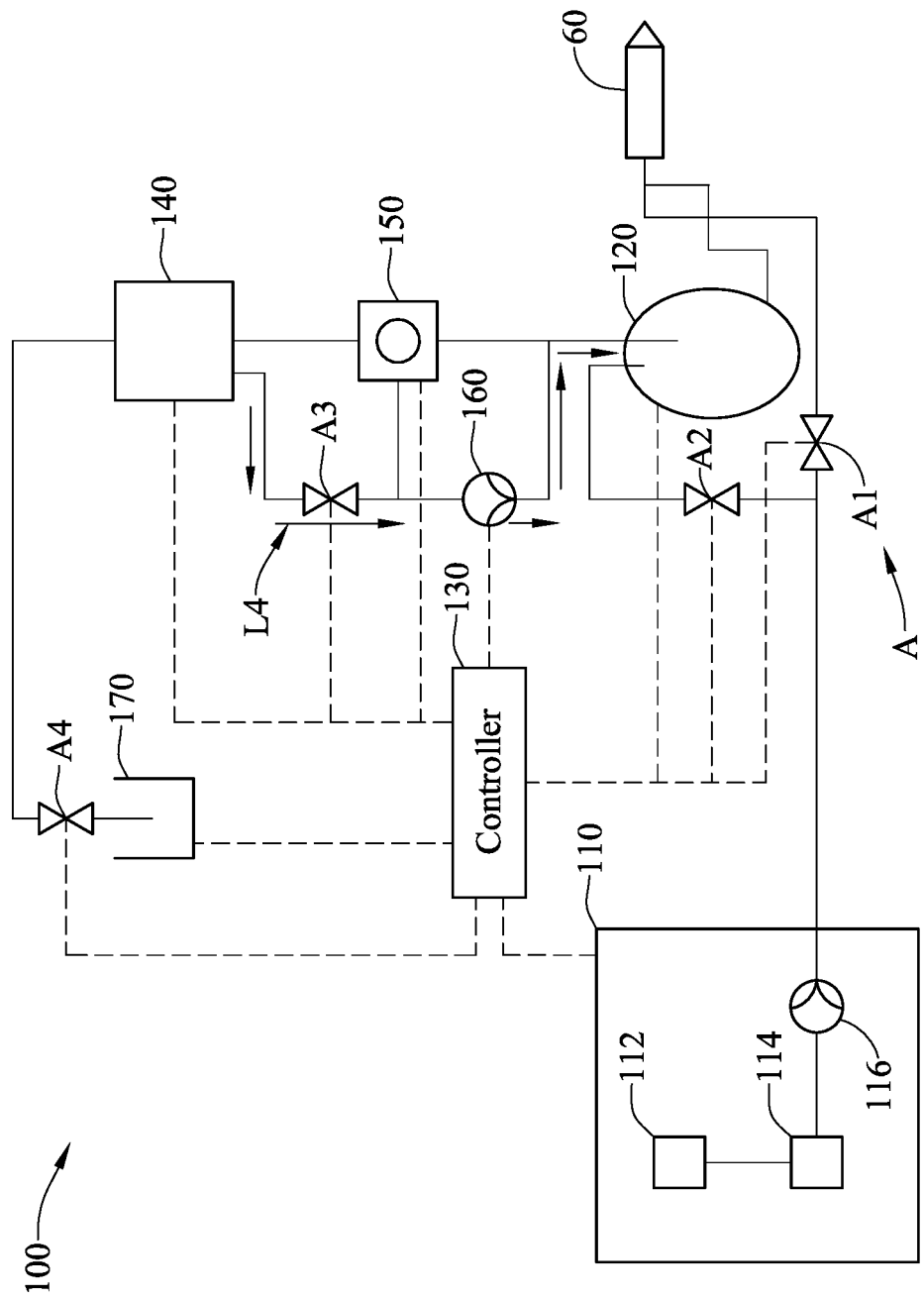
FIG. 5 illustrates schematically a flow path of FIG. 1 from the chemical solution tank to the mixing tank via the low-pressure auxiliary pump.

In FIG. 5, if the controller 130 detects any change in the variations of the concentration, the flow rate and the temperature of the chemical solution in the mixing tank 120 and determines that a pressure increase upon the chemical solution is necessary, then the controller would open the third directional valve A3, and close the hydraulic-control solenoid valve 150, so as to form the fourth flow path from the chemical solution tank 140 to the mixing tank 120 via the low-pressure auxiliary pump 160. By utilizing the low-pressure auxiliary pump 160 to evenly supply the chemical solution and the third directional valve A3 to control the flow of the chemical solution, then deposition of the chemical solution inside the mixing tank 120 can be avoided.

Figure 6:
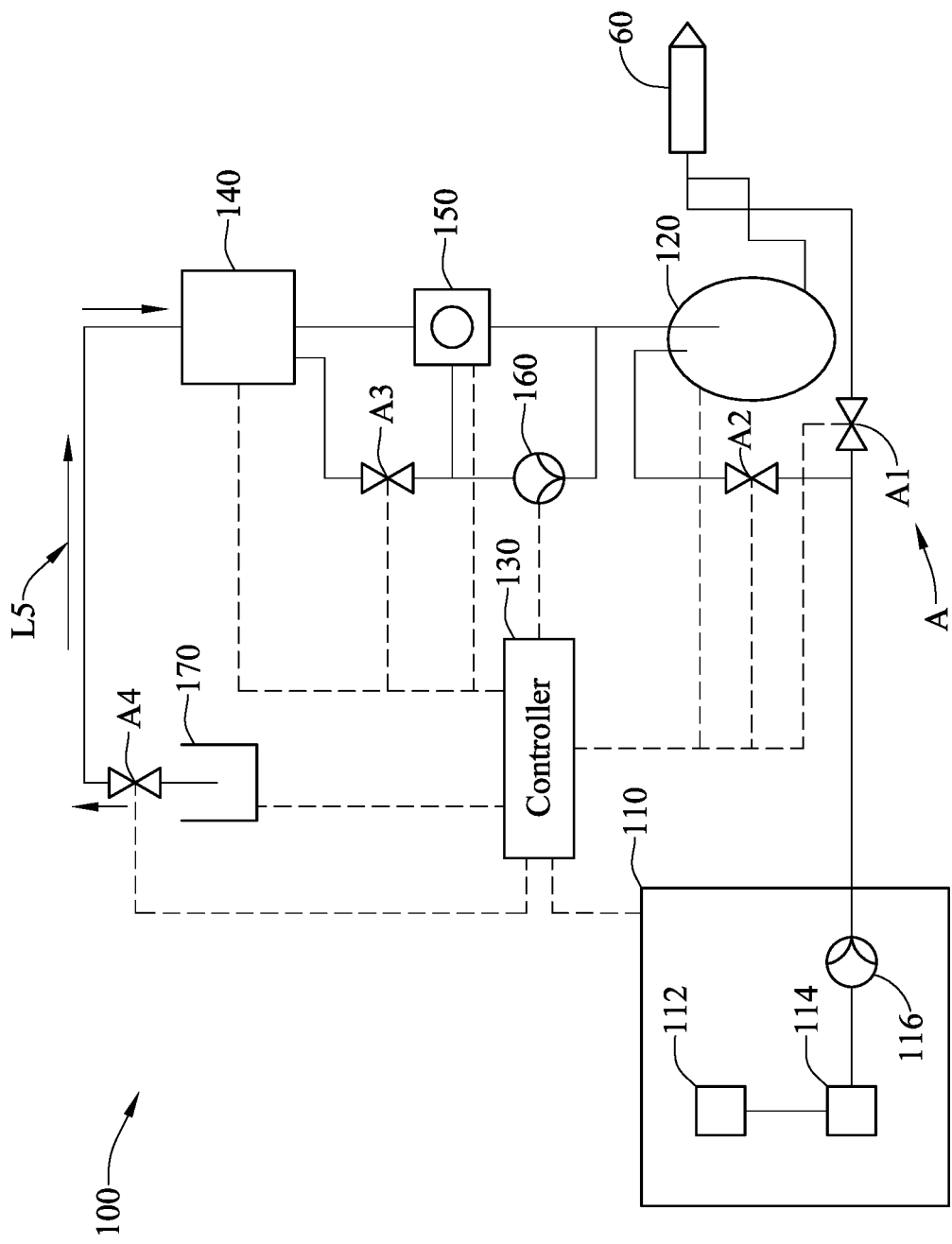
FIG. 6 illustrates schematically a flow path of FIG. 1 for the chemical-solution refill barrel to supply the chemical solution to the chemical solution tank.

In addition, the chemical solution tank 140 of this disclosure utilizes a fourth directional valve A4 to connect spatially the chemical-solution refill barrel 170. While the chemical solution tank 140 is providing the chemical solution, the controller 130 would detect simultaneously the changes of the concentration and temperature of the polymer inside the chemical solution tank 140. As shown in FIG. 6, while in meeting a deficiency, the controller 130 would evaluate detection values inside the chemical-solution refill barrel 170 to open the fourth directional valve A4, such that a fifth flow path L5 between the chemical-solution refill barrel 170 and the chemical solution tank 140 would be established for the chemical-solution refill barrel 170 to refill the chemical solution (a polymer solution for example) into the chemical solution tank 140.

In one embodiment, the controller 130 would smartly monitor the pressures, temperatures, concentrations and volumes of the chemical solution inside the high-pressure direct drive pump assembly 110, the mixing tank 120, the chemical solution tank 140 and the chemical-solution refill barrel 170. Then, it is determined whether a direct pump or a bypass pump is adopted as the high-pressure direct drive pump to discharge the high-pressure chemical solution at a high speed via the nozzle 60 to process the thermosetting materials. In the case that the direct pump is adopted, then refer to the exemplary example shown in FIG. 2. In the case that the bypass bump is adopted, the refer to the exemplary example shown in FIG. 3. Also, the concentration of the chemical solution inside the mixing tank 120 can be modulated by the controller 130. With the intelligent monitoring by the controller 130, the electronegativity of the resulted chemical solution (a polymer solution for example) can be greater than 1.8. The controller 130 can perform the concentration monitoring upon the chemical solution inside the mixing tank 120 so as to ensure the constant concentration state of the chemical solution. When the controller 130 detects any deficiency in the concentration, the flow rate and the temperature of the chemical solution inside the mixing tank 120, the chemical solution tank 140 is utilized to provide the chemical solution (a polymer solution for example) into the mixing tank 120, and at the same time the third directional valve A3 can be opened according to a practical increase need of the pressure, the concentration and the flow rate of the chemical solution. Further, the hydraulic-control solenoid valve 150 can be utilized to provide the chemical solution in the chemical solution tank 140 to the mixing tank 120 so as to modulate the concentration of the chemical solution in the mixing tank 120. In another embodiment, while the controller 130 determines that an pressure increase upon the chemical solution is necessary, then the controller would open the third directional valve A3, and close the hydraulic-control solenoid valve 150. Thus, the low-pressure auxiliary pump 160 would be utilized to evenly transmit the chemical solution. With the third directional valve A3 to control the flow of the chemical solution, then possible deposition of the chemical solution in the mixing tank 120 can be avoided.

In addition, the controller 130 would keep smartly monitoring the pressure, the temperature, the concentration and the volume of the chemical solution in the chemical solution tank 140. While any deficiency is detected, the chemical-solution refill barrel 170 would be used to refill the chemical solution tank 140.

In summary, by providing such the machine for smashing the thermosetting materials in this disclosure, the high-pressure chemical solution (a polymer solution for example) can be discharged via the nozzle to process the thermosetting materials. Thereupon, the thermosetting materials can be recovered as a new functional material, and also the re-usability thereof can be substantially enhanced.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A machine for smashing thermosetting materials, comprising:
   a high-pressure direct drive pump assembly;
   a mixing tank;
   a chemical solution tank;
   a hydraulic-control solenoid valve, connected spatially between the chemical solution tank and the mixing tank;
   a low-pressure auxiliary pump;
   a directional valve set, including a first directional valve, a second directional valve and a third directional valve, the first directional valve being configured to connect spatially between the high-pressure direct drive pump assembly and a nozzle, the second directional valve being configured to connect spatially between the high-pressure direct drive pump assembly and the mixing tank, the third directional valve being configured to connect spatially between the chemical solution tank and the mixing tank; and
   a controller, connected signally with the high-pressure direct drive pump assembly, the mixing tank, the chemical solution tank, the hydraulic-control solenoid valve, the low-pressure auxiliary pump and the directional valve set,
   wherein the controller is configured to control opens and closes of the first directional valve, the second directional valve, the third directional valve and the hydraulic-control solenoid valve.

2. The machine for smashing thermosetting materials of claim 1, further including a chemical-solution refill barrel connected signally with the controller, the directional valve set further including a fourth directional valve connected spatially with the chemical solution tank and the chemical-solution refill barrel, the controller being configured to control open and close of the fourth directional valve.

3. The machine for smashing thermosetting materials of claim 1, wherein the high-pressure direct drive pump assembly includes a solution tank, a direct drive pump and a boost source connected between the solution tank and the direct drive pump.

* * * * *